United States Patent

Orsley (10) Patent No.: US 9,562,388 B2
(45) Date of Patent: Feb. 7, 2017

(54) METHODS OF FORMING POLARIZED PANES FOR VARIABLE TRANSMISSION WINDOWS

(71) Applicant: CORNING INCORPORATED, Corning, NY (US)

(72) Inventor: Timothy James Orsley, San Jose, CA (US)

(73) Assignee: Corning Incorporated, Corning, NY (US)

( * ) Notice: Subject to any disclaimer, the term of this patent is extended or adjusted under 35 U.S.C. 154(b) by 310 days.

(21) Appl. No.: 13/949,933

(22) Filed: Jul. 24, 2013

(65) Prior Publication Data

US 2015/0026951 A1    Jan. 29, 2015

(51) Int. Cl.
| | | |
|---|---|---|
| *E06B 3/54* | (2006.01) | |
| *C03C 17/00* | (2006.01) | |
| *G02B 5/30* | (2006.01) | |
| *G02B 27/28* | (2006.01) | |
| *G02B 1/10* | (2015.01) | |

(52) U.S. Cl.
CPC ............... *E06B 3/54* (2013.01); *C03C 17/002* (2013.01); *G02B 1/10* (2013.01); *G02B 5/3025* (2013.01); *G02B 27/281* (2013.01); *C03C 2217/70* (2013.01); *C03C 2217/77* (2013.01); *C03C 2218/31* (2013.01); *Y10T 29/49883* (2015.01); *Y10T 29/49885* (2015.01); *Y10T 29/49886* (2015.01)

(58) Field of Classification Search
CPC ....... E06B 3/54; G02B 27/281; G02B 5/3025; C03C 17/002; C03C 2217/70; C03C 2217/77; C03C 221/318; Y10T 29/49883; Y10T 29/49885; Y10T 29/49888; Y10T 29/49886
USPC .................................. 29/458, 456, 457, 459
See application file for complete search history.

(56) References Cited

U.S. PATENT DOCUMENTS

| | | | | |
|---|---|---|---|---|
| 2,260,220 A | * | 10/1941 | Martin .................... | 359/486.02 |
| 2,281,112 A | * | 4/1942 | Ryan ........................ | 359/486.02 |
| 2,398,506 A | * | 4/1946 | Rogers .................... | 359/487.05 |

(Continued)

FOREIGN PATENT DOCUMENTS

| | | |
|---|---|---|
| CN | 2224260 | 4/1996 |
| CN | 2280764 | 5/1998 |

(Continued)

OTHER PUBLICATIONS

J. Cognard, "Alignment of nematic liquid crystals and their mixtures", Molecular Crystals and Liquid Crystals, Gordon and Breach, GB, vol. 1, Jan. 1, 1981, pp. 1-77.

(Continued)

*Primary Examiner* — Christopher Besler
*Assistant Examiner* — Bayan Salone (57) ABSTRACT

Methods of forming polarized panes for variable transmission windows are disclosed. The polarized panes are formed from transparent substrates that are brushed with a brushing pattern that varies continuously in a select direction over each of one or more periods. A layer of polarizable material such as POLARCOAT material can be deposited on and responds to the brushed surface by forming a polarization pattern that substantially matches the brushing pattern and thus also includes one or more periods.

19 Claims, 12 Drawing Sheets

(56) References Cited

U.S. PATENT DOCUMENTS

| | | | | |
|---|---|---|---|---|
| 2,617,329 | A | * | 11/1952 | Dreyer .................... 359/486.02 |
| 2,977,345 | A | * | 3/1961 | Fischer ............... C08K 5/0025 |
| | | | | 525/332.7 |
| 2,977,845 | A | * | 4/1961 | Boone .................... G02B 27/06 |
| | | | | 352/87 |
| 3,218,926 | A | * | 11/1965 | Boone .................... G09F 19/18 |
| | | | | 156/234 |
| 3,563,130 | A | * | 2/1971 | Elliott .................... A63J 17/00 |
| | | | | 84/464 R |
| 3,658,616 | A | * | 4/1972 | Dreyer ................. B44C 1/1733 |
| | | | | 156/234 |
| 3,943,573 | A | | 3/1976 | Budmiger ......................... 2/8.3 |
| 4,123,141 | A | * | 10/1978 | Schuler .................... 359/489.07 |
| 4,285,577 | A | * | 8/1981 | Schuler .................... 359/489.07 |
| 4,364,375 | A | * | 12/1982 | Younghouse ................. 126/666 |
| 4,902,112 | A | | 2/1990 | Lowe ............................ 350/396 |
| 5,033,829 | A | | 7/1991 | Faroughy |
| 5,164,856 | A | * | 11/1992 | Zhang et al. ........... 359/486.02 |
| 5,686,975 | A | * | 11/1997 | Lipton ............................ 349/15 |
| 5,739,296 | A | * | 4/1998 | Gvon et al. .................... 534/577 |
| 5,901,967 | A | * | 5/1999 | Morisaki ...................... 279/4.12 |
| 5,999,316 | A | * | 12/1999 | Allen et al. ............... 359/485.04 |
| 6,161,607 | A | * | 12/2000 | de Kimpe et al. ............ 160/238 |
| 6,174,394 | B1 | * | 1/2001 | Gvon et al. .................... 156/100 |
| 6,414,790 | B1 | * | 7/2002 | Bennett .................... 359/486.02 |
| 7,162,136 | B1 | * | 1/2007 | Pertl et al. .................... 385/140 |
| 8,308,293 | B2 | * | 11/2012 | Watanabe et al. ....... 351/159.56 |
| 8,310,757 | B2 | * | 11/2012 | McLeod et al. ......... 359/490.01 |
| 8,508,681 | B2 | * | 8/2013 | Tatzel et al. .................... 349/18 |
| 2002/0039628 | A1 | * | 4/2002 | Ogawa ............. G02F 1/133719 |
| | | | | 428/1.2 |
| 2006/0193046 | A1 | * | 8/2006 | Yellin ........................... 359/489 |
| 2007/0097503 | A1 | | 5/2007 | Tsuji |
| 2007/0146599 | A1 | * | 6/2007 | Uchida ............. G02F 1/133753 |
| | | | | 349/129 |
| 2007/0163732 | A1 | * | 7/2007 | Konstantin et al. .......... 160/237 |
| 2010/0053751 | A1 | * | 3/2010 | McLeod .............. G02B 5/3083 |
| | | | | 359/485.05 |
| 2011/0037943 | A1 | * | 2/2011 | Watanabe et al. ............ 351/163 |
| 2012/0169950 | A1 | * | 7/2012 | Tatzel et al. .................... 349/18 |

FOREIGN PATENT DOCUMENTS

| | | | |
|---|---|---|---|
| CN | 2714767 | 8/2005 | |
| CN | 200999574 | 1/2008 | |
| CN | 201110111 | 9/2008 | |
| CN | 201206411 Y | 3/2009 | .............. E06B 5/20 |
| DE | 4327095 | 7/1994 | ............... B60J 3/06 |
| DE | 19835490 | 2/2000 | ............. G02B 26/02 |
| DE | 19835490 A1 * | 2/2000 | ............. G02B 26/02 |
| GB | 2154268 | 9/1985 | .............. E06B 9/24 |
| GB | 2154268 A * | 9/1985 | .............. E06B 9/24 |
| GB | 2270104 | 3/1994 | .............. E06B 9/24 |
| GB | 2270104 A * | 3/1994 | .............. E06B 9/24 |
| JP | 62050222 | 3/1987 | ............... B60J 3/06 |
| JP | 62050222 A * | 3/1987 | ............... B60J 3/06 |
| JP | 3144093 | 6/1991 | ............ E06B 26/02 |
| JP | 3262890 | 11/1991 | |
| JP | 7305448 | 11/1995 | |
| JP | 8165866 | 6/1996 | |
| JP | 10238255 | 9/1998 | |
| JP | 11218609 | 8/1999 | |
| JP | 2000170465 | 6/2000 | |
| JP | 2001526406 | 12/2001 | .............. E06B 9/24 |
| JP | 2010084483 | 4/2010 | |
| KR | 2011010017 | 1/2011 | |
| RO | 122682 | 11/2009 | |
| RU | 2167989 | 5/2001 | |
| WO | WO94/10621 | 5/1994 | ............. G05D 25/00 |
| WO | WO 9410621 A1 * | 5/1994 | ............. G05D 25/00 |

OTHER PUBLICATIONS

PCT Application No. PCT/US2014/047351, filed Jul. 21, 2014, PCT Search Report dated Oct. 24, 2014.

* cited by examiner

METHODS OF FORMING POLARIZED PANES FOR VARIABLE TRANSMISSION WINDOWS

FIELD

The present disclosure relates to variable transmission windows and in particular to methods of forming polarized panes for variable transmission windows.

BACKGROUND

Variable transmission windows are used in a variety of structures, particularly those having a living space (e.g., houses, buildings, cars, boats, etc.) to control the amount of light and heat that enters the living space from the outside environment and to provide privacy.

One type of variable transmission window uses two parallel polarized panes, with one or both panes being linearly translatable relative to the other. The relative shift between the polarized panes defines the window transmission. It is usually preferred that the polarized panes each have a polarization pattern such that a relatively small translation of one pane produces a substantial change in the overall transmission of the variable transmission window.

Unfortunately, the quality and performance of the variable transmission of variable transmission windows is wanting. Further, their manufacturing cost tends to be relatively high.

SUMMARY

An aspect of the disclosure is a method of forming a polarized pane for a window having a variable transmission. The method includes brushing a surface of a transparent plate to create a brushed surface having a brushing pattern, wherein the brushing pattern has at least one period and varies continuously in a select direction within each period. The method also includes depositing a polarizable material on the brushed surface to form a polarization pattern in the polarizable material substantially following the brushing pattern.

Another aspect of the disclosure is a method of forming a polarized pane for a variable transmission window. The method includes brushing a surface of a transparent plate while using a mask to continuously vary an amount of exposed surface to create a brushing pattern that varies continuously in a select direction for each of one or more periods. The method also includes depositing a layer of polarizable material on the brushed plate surface to create a polarization pattern substantially matching the brushing pattern.

Another aspect of the disclosure is a method of forming a polarized pane using a glass plate having a surface. The method includes brushing the surface to form a brushing pattern that varies continuously in a select direction for each of multiple periods, wherein the brushing pattern in each period is substantially identical. The method also includes coating the brushed surface with a polarizable material to create a polarization pattern having the same number of multiple periods as and being substantially identical to the brushing pattern.

Another aspect of the disclosure is a method forming a variable transmission window. The method includes forming first and second polarized panes using the methods disclosed herein. The method further includes arranging the first and second polarized panes in a frame adapted to allow for at least one of the first and second polarized panes to linearly translate relative to the other polarized pane to define a variable transmission.

Additional features and advantages will be set forth in the Detailed Description that follows, and in part will be readily apparent to those skilled in the art from the description or recognized by practicing the embodiments as described in the written description and claims thereof, as well as the appended drawings. It is to be understood that both the foregoing general description and the following Detailed Description are merely exemplary and are intended to provide an overview or framework for understanding the nature and character of the claims.

BRIEF DESCRIPTION OF THE DRAWINGS

The accompanying drawings are included to provide a further understanding and are incorporated in and constitute a part of this specification. The drawings illustrate one or more embodiment(s) and together with the Detailed Description serve to explain the principles and operation of the various embodiments. As such, the disclosure will become more fully understood from the following Detailed Description, taken in conjunction with the accompanying Figures.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this

DETAILED DESCRIPTION

The entire disclosure of any publication or patent document mentioned herein is incorporated by reference, including U.S. Pat. Nos. 6,414,790; 2,260,220; 2,281,112; 4,123, 141; and 5,164,856; and U.S. Pub. No. 2012/0169950.

Cartesian coordinates are shown in some of the Figures for the sake of reference and are not intended to be limiting as to direction or orientation. Likewise, reference to brushing patterns and polarization patterns with orientations that vary over a given angular range, e.g., from 0° to 180° is not intended as being limiting to absolute vertical or horizontal but is intended to include a relative measurement of relative orientations (e.g., from −90° to +90°, from 20° to 200°, etc.). The brush patterns 24 and polarization patterns 34 described below are shown in a select orientation relative to sides of plate 20 to facilitate the discussion and should not so limit the claims appended herewith.

In the description below, in some instances a reference number has an added letter A or B to distinguish between different ones of the same type of component or element. Thus, for example, two polarized panes 10 as discussed below are referred to as polarized pane 10A and polarized pane 10B in the context of a variable transmission window 6 that uses two polarized panes.

Figure 1A:
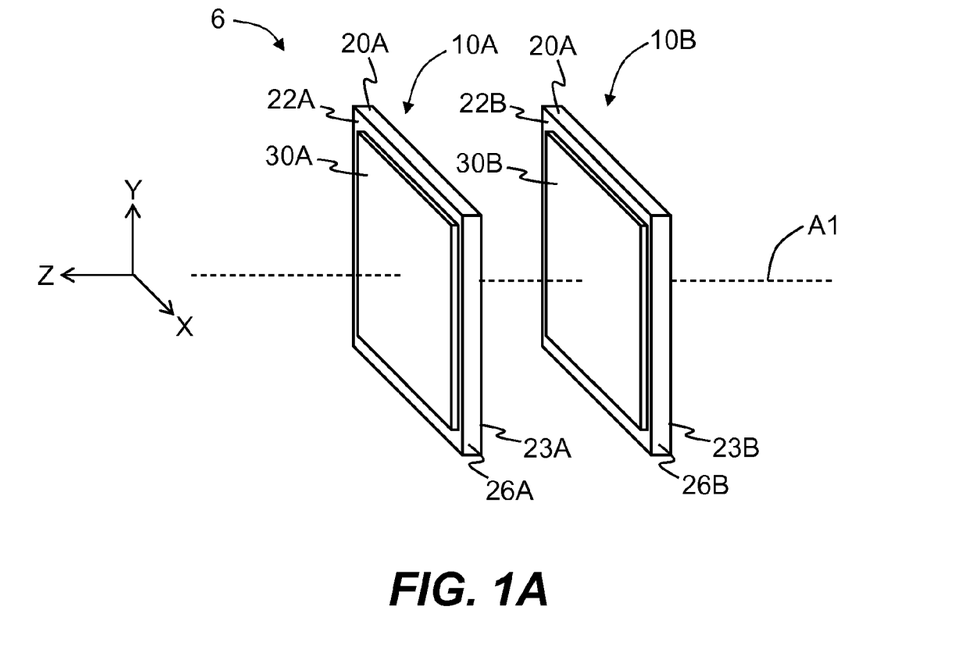
FIG. 1A is an elevated and partially exploded view of an exemplary variable transmission window according to the disclosure.
Figure 1B:
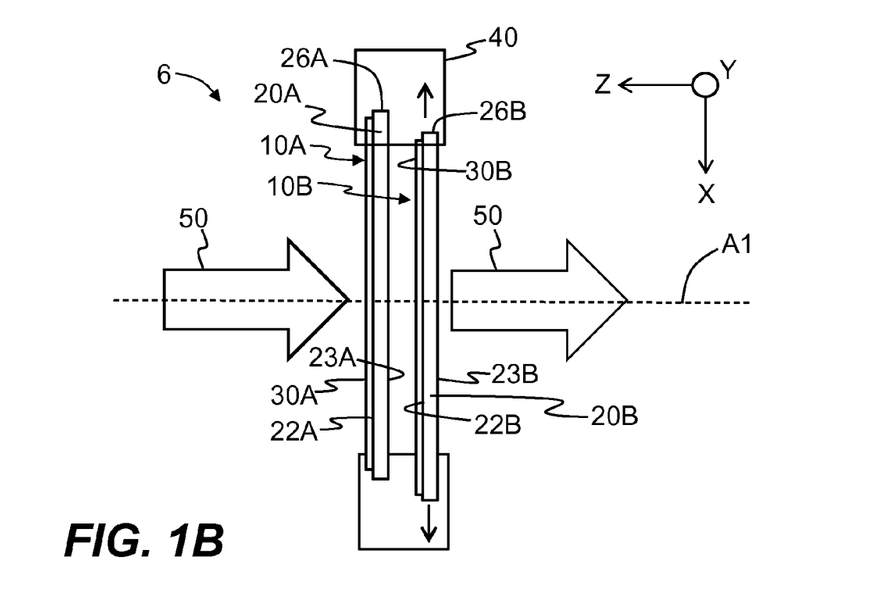
FIG. 1B is a cross-sectional view in the X-Z plane of an exemplary variable transmission window similar to that of FIG. 1A.

FIG. 1A is an elevated and partially exploded view of an exemplary variable transmission window 6, and FIG. 1B is a cross-sectional view in the X-Z plane of an exemplary variable transmission window similar to that of FIG. 1A. The variable transmission window 6 includes two polarized panes 10 (denoted 10A and 10B) arranged parallel to one another and spaced apart along a central axis A1. The polarized pane 10A includes a transparent plate 20A having front and back surfaces 22A and 23A and a perimeter 26A. Likewise, polarized pane 10B includes a transparent plate 20B having front and back surfaces 22B and 23B and a perimeter 26B.

The transparent plate 20 of pane 10 can be any transparent material preserving a brushing pattern as described below. Here, "brushing pattern" means a pattern caused by brushing that serves to define a polarization pattern in a polarization material (coating) deposited on the brush surface, wherein the polarization pattern substantially matches the brushing pattern. As noted below, the brushing pattern is generally not visible. Exemplary materials for plate 20 include, but are not limited to, glass, acrylic or plastic.

FIG. 1B shows a cross-sectional view of an exemplary variable transmission window 6 that includes a frame 40 that operably supports polarized panes 10A and 10B at or near their respective perimeters 26A and 26B. The frame 40 can be configured so at least one of panes 10A and 10B can be translated in a select direction, such as the X-direction shown in FIG. 1B (solid arrows).

The polarized panes 10A and 10B include respective polarization coatings 30A and 30B. The polarization coatings 30A and 30B are shown as residing on front surfaces 22A and 22B of panes 20A and 20B, though the polarization coatings can also be on back surfaces 23A and 23B or on one front surface and one back surface.

In an example, polarization coatings 30A and 30B can be formed from a polarizable material, such as, but not limited to, a POLARCOAT polarizable coating (hereinafter, "POLARCOAT"), a registered trademark of Corning, Inc., Corning, N.Y. It should be noted that while many embodiments described herein refer to POLARCOAT, the claims appended herewith should not be so limited. The polarization coatings 30A and 30B each have a substantially continuously varying change in polarization in the direction of translation (e.g., the X-direction as shown) over each of one or more polarization pattern periods p. The method of patterning of polarization coatings 30A and 30B to generate a continuously varying polarization pattern over each of one or more periods p is discussed in greater detail below. In an example, the polarizable material making up polarization coatings 30A and 30B can be spin-coated onto transparent plates 20A and 20B, respectively.

FIG. 1B shows light 50 traveling in the −Z-direction and passing through variable transmission window 6 by first passing through polarized pane 10A and then polarized pane 10B. The light 50 is shown as having a lower intensity (i.e., a lighter arrow) owing to being attenuated by passing through variable transmission window 6.

Figure 2A:
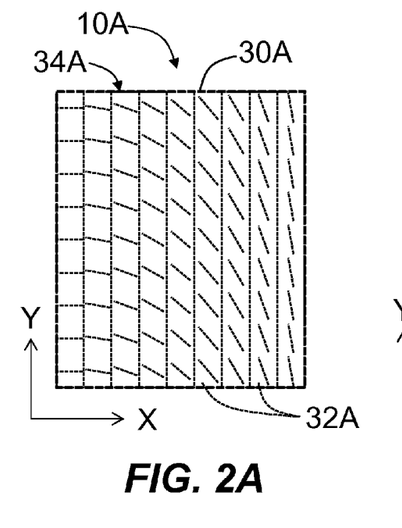
FIGS. 2A and 2B are front-on views of exemplary polarized panes wherein the polarization coatings are shown, for ease of illustration, as having discrete polarized regions.
Figure 2B:
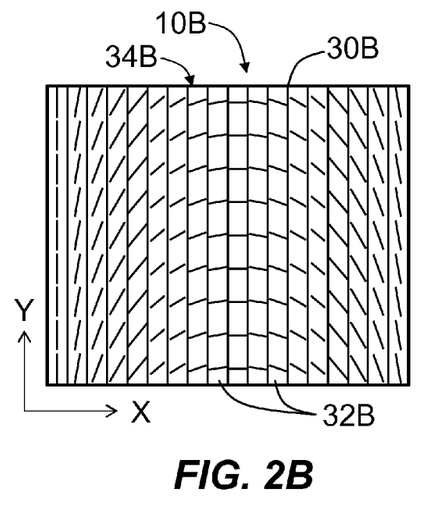

FIGS. 2A and 2B are front-on views of exemplary polarized panes 10A and 10B. The polarization coatings 30A and 30B are shown in FIGS. 2A and 2B as having discrete polarized regions 32A and 32B, each with a select polarization orientation for ease of illustration and to facilitate description of the basic operation of the polarization coatings in variable transmission window 6. The discrete polarization regions 32A and 32B are in the form of strips that are long in the Y-direction, wherein the polarization can be constant within a given region, but undergo polarization changes from region to region in the X-direction. In the actual polarization coatings 30A and 30B, the change in polarization orientation in the X-direction can be substantially continuous over a given period p, i.e., there are no discrete polarization regions within a given period. The short lines in each polarization region 32A and 32B indicate the polarization direction for the given region and define respective polarization patterns 34A and 34B for polarization coatings 30A and 30B. The short lines depicting the polarization orientation in polarization regions 32A of pane 30A are shown using dashed lines to more easily distinguish them from the solid short lines for the polarization regions 32B of pane 30B.

Figure 3A:
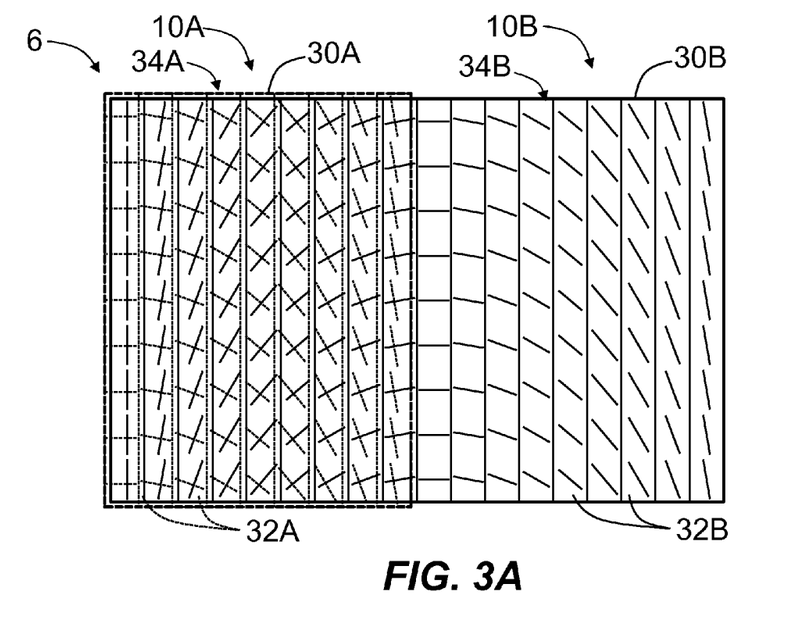
FIGS. 3A through 3C are front-on views of an exemplary variable transmission window made up of the polarized panes of FIGS. 2A and 2B, showing three different translation positions that correspond to three different window transmissions.
Figure 3B:
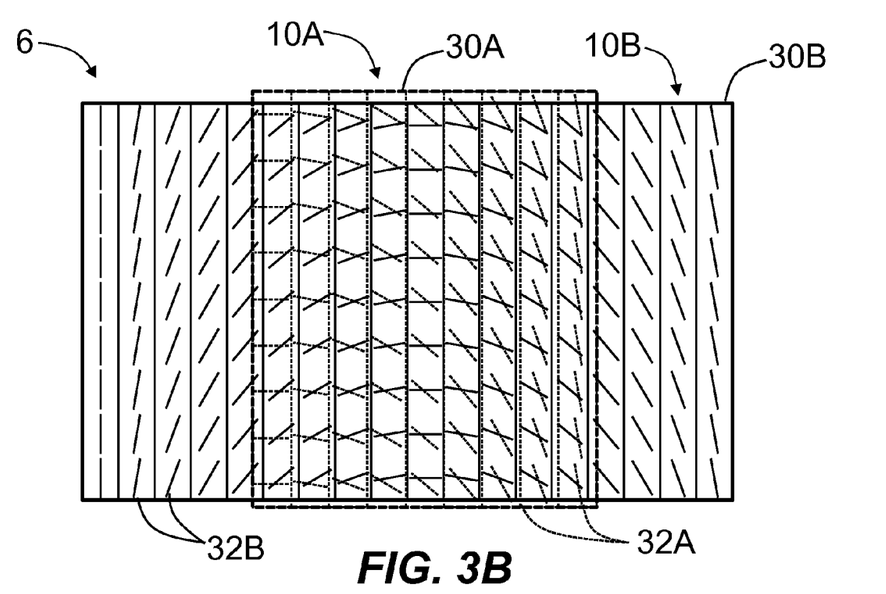
Figure 3C:
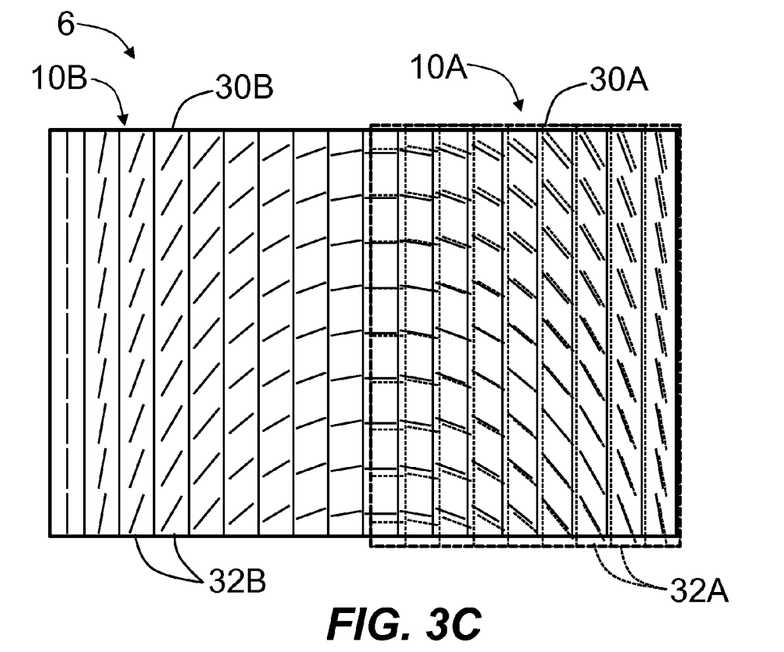

FIGS. 3A through 3C are front-on views of an exemplary variable transmission window 6 made up of polarized panes 10A and 10B of FIGS. 2A and 2B, showing three different translation positions corresponding to three different window transmissions.

FIG. 3A shows polarized pane 10A near the left edge of polarized pane 10B. The overlapping polarization regions 32A and 32B are substantially cross-polarized (i.e., at nearly a 90° angle), indicating a relatively high attenuation and thus a relatively low transmission for light 50 (see FIG. 1B). FIG. 3B shows polarized pane 10A at about the center of polarized pane 10B and shows the overlapping polarization regions 32A and 32B as having about a 40° angle, indicating a moderate attenuation and thus a medium transmission for light 50. FIG. 3C shows polarized pane 10A at the right edge of polarized pane 10B and shows the overlapping polarization regions 32A and 32B as being essentially parallel, indicating very little attenuation and thus a high transmission for light 50.

In this manner, the varying polarization pattern in polarization coatings 30A and 30B allows for a linear translation of pane 10A relative to pane 10B to adjust the transmission of variable transmission window 6. The attenuation effect over the translation range can be optimum when polarization coatings 30A and 30B have a continuous variation in polarization orientation of polarization pattern 34 over each period p in the direction of translation.

A benefit of having a continuous variation in polarization pattern 34 undesirable visual artifacts that appear in variable transmission window 6 having discrete polarization regions 32A and 32B can be substantially reduced or eliminated. When discrete polarization regions 32A and 32B are not properly aligned, visible stripes alternating between darker stripes and lighter stripes can occur. The difference in darkness and lightness can be fairly significant even with relatively small polarization angle differences (e.g., up to 17% with a 10° polarization difference). The difference in darkness and lightness varies with the absolute lightness/darkness over variable transmission window 6. The difference can be generally smallest when the window is near its darkest and lightest states and can be generally greatest when halfway between these states.

Figure 4A:
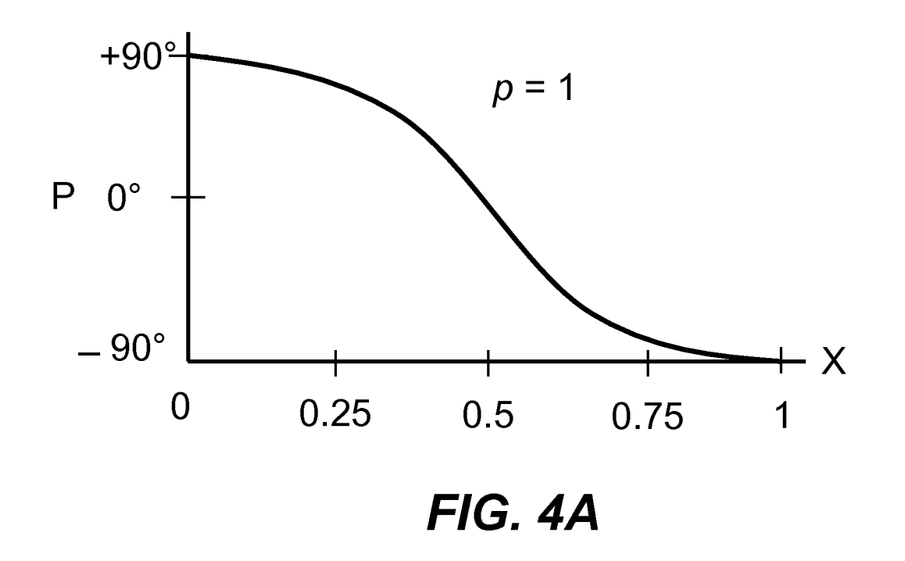
FIG. 4A is a plot of the absolute value of the polarization |P| versus the normalized dimension X illustrating an exemplary polarization pattern of the polarized pane having a unit width and a single period across the pane (p=1).
Figure 4B:
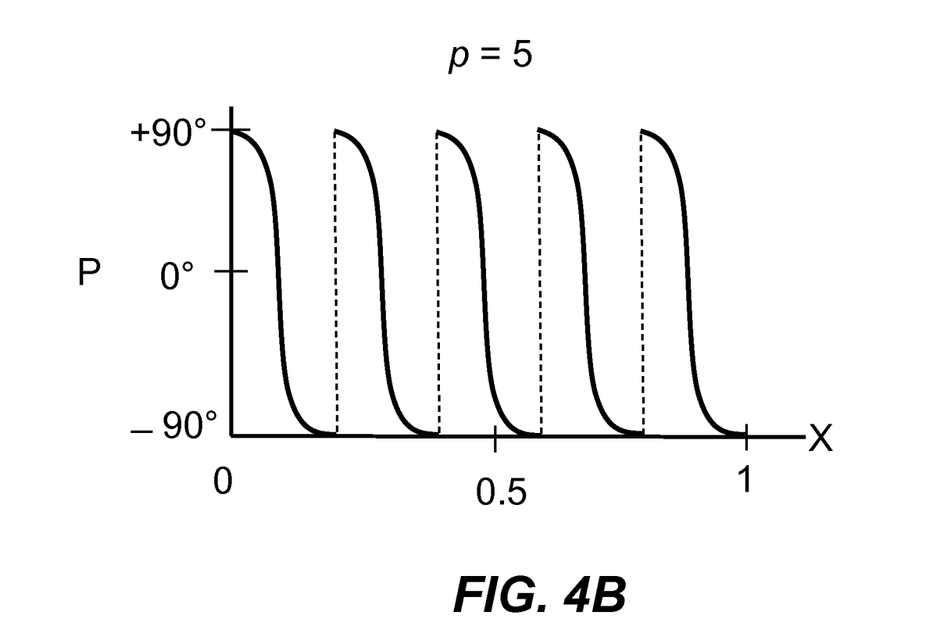
FIG. 4B is a plot similar to FIG. 4A but illustrates an exemplary polarization pattern of a polarized pane having five periods across the pane (p=5).

FIG. 4A is a plot of the absolute value of a polarization P in degrees versus x (normalized units) for an example polarized pane 10A or 10B having a unit width (x=1). Here, the term "polarization" means polarization orientation. As illustrated the polarization P varies smoothly from +90° at one edge to 0° at the middle of the pane to −90° at the opposite edge. Thus, polarization P has one period p, i.e., p=1. FIG. 4B shows an exemplary polarization plot for an example polarized pane 10A or 10B having multiple periods p, e.g., p=5.

It should be noted that polarization P varies continuously in a selection direction within a given period p but can jump between adjacent periods. This apparent discontinuity is not problematic because panes 10A and 10B are shifted relative to each other over a single period. Also, it should be noted that polarization P can be substantially the same as P+180° so there can effectively be polarization continuity even between adjacent periods p.

Figure 4C:
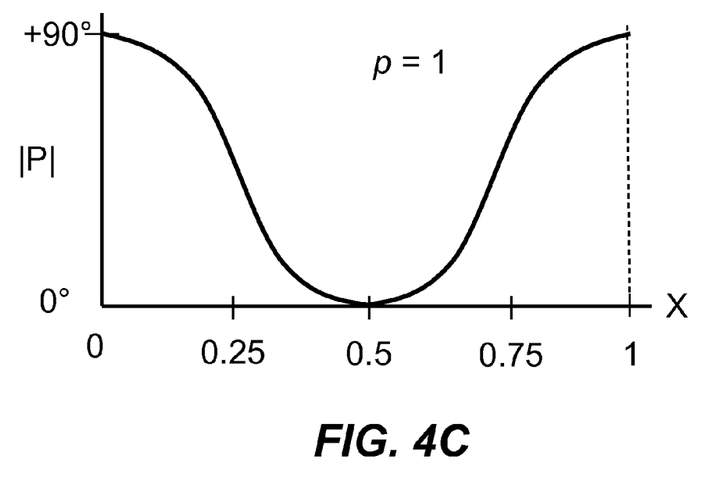
FIGS. 4C and 4D are similar to FIGS. 4B and 4A but plot the magnitude of the polarization P, i.e., |P| wherein each period p lies in a range of |P| from 0° to 90°.
Figure 4D:
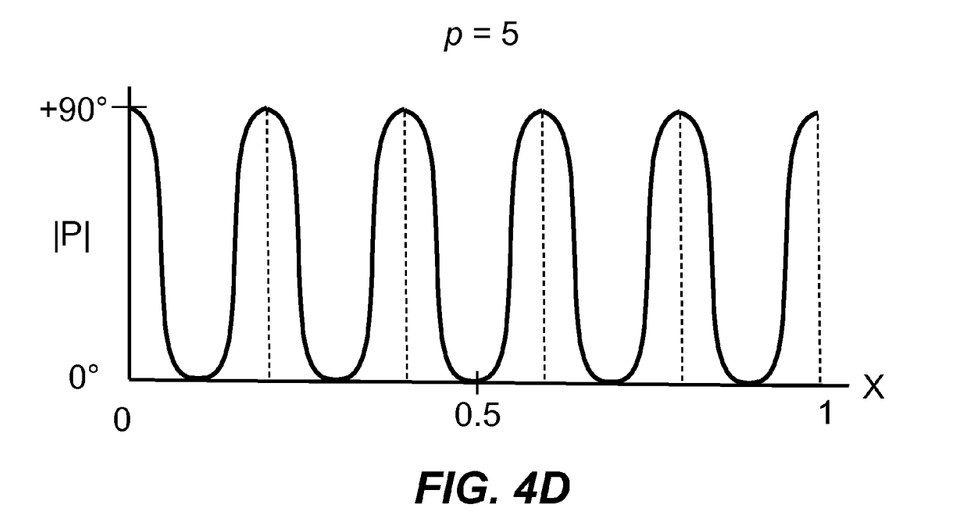

It should also be noted that an exemplary range over which the polarization orientation (i.e., polarization P) varies within a given period can be 180°, e.g., between the limits of 0° and 180° as shown in FIG. 4A. FIGS. 4C and 4D are similar to FIGS. 4A and 4B and plot the magnitude of polarization P, i.e., |P| over a range of 0° to 90°.

Another exemplary range for polarization P can be 90°. This is because polarized panes 10A and 10B when used in variable transmission window 6 need only provide relative polarization orientations between 0° (i.e., parallel and thus maximum transmission) and 90° (i.e., crossed and thus minimum transmission). So in an exemplary embodiment, the range of polarization P within a given period can be at least 90°.

Generally, the range over which polarization P varies can be any range consistent with a desired attenuation range for variable transmission window 6. In some exemplary variable transmission windows 6, the transmission need not vary from close to 0% to close to 100% and can vary over much smaller ranges, e.g., 0% to 25%, or 25% to 75%, etc.

Figure 5:
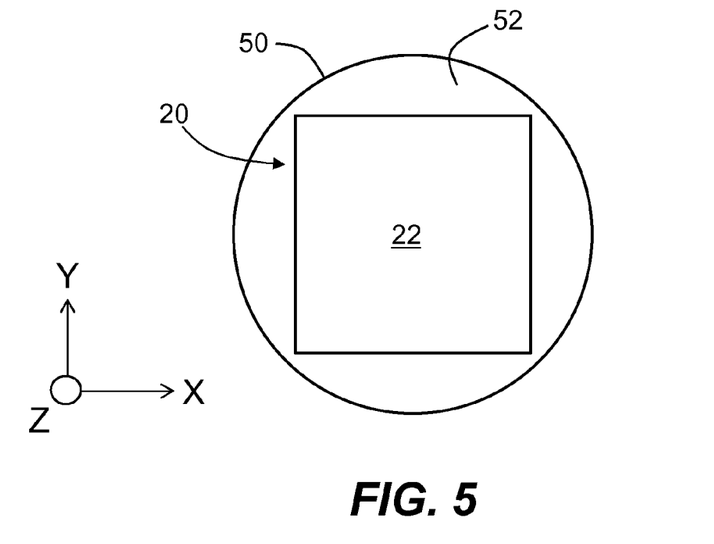
FIG. 5 is a top-down view of an exemplary plate residing on a turntable prior to being brushed.

FIG. 5 is a top-down view of a turntable 50 having a top surface 52 supporting transparent plate 20 wherein the plate front surface 22 has yet to be brushed. As illustrated, the brushing of plate front surface 22 preserves a brushing pattern 24 serving to define a polarization direction for a later-applied polarization coating 30 such as, but not limited to, POLARCOAT, which can be responsive to the brushing pattern so that polarization pattern 34 can be substantially the same as the brushing pattern (i.e., substantially follows the brushing pattern). Moreover, the last brushing direction applied to plate front surface 22 "erases" any previous brushing direction and can be the one remaining "frozen" into plate 20 unless the plate is brushed again. Thus, the brushing direction (orientation) of brushing pattern 24 defines the polarization orientation of polarization pattern 34 in the later-applied POLARCOAT.

The brushing pattern 24 is generally not visible and, without intending to be bound by theory, is believed to be a result of an electrostatic effect imparted to the dielectric plate 20. Thus, in an exemplary embodiment, one method of measuring brushing pattern 24 can be to use POLARCOAT and then measure the resulting polarization pattern 34.

Figure 6:
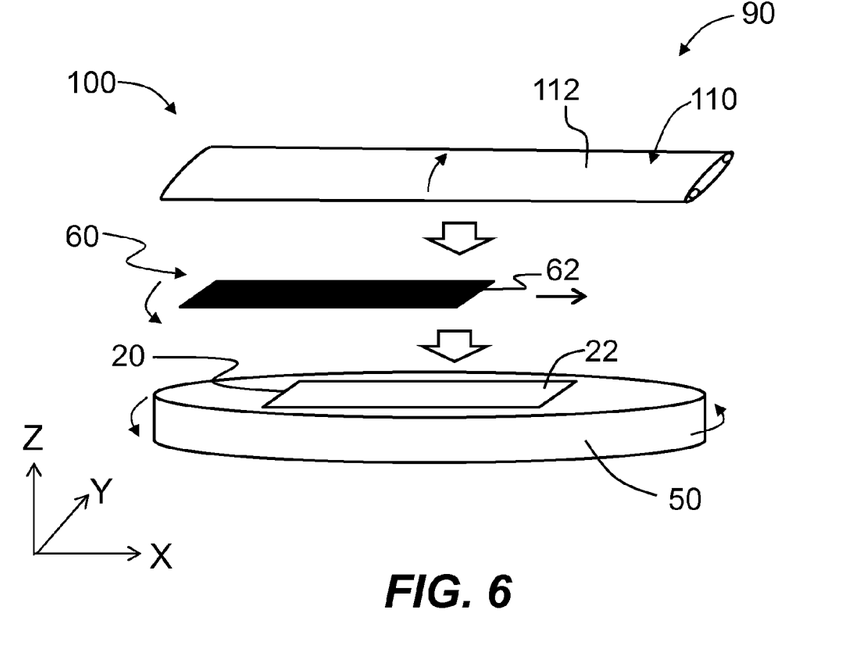
FIG. 6 is a partially exploded view of an exemplary system that includes a brushing device and a mask for forming a continuously varying brushing pattern on the plate surface.

FIG. 6 is an elevated partially exploded view of an exemplary brushing system 90 used to brush plate front surface 22 as part of the process of forming polarization pattern 34 continuously varying in a select direction. The brushing system 90 includes turntable 50 and a mask 60 disposed above the turntable and thus above plate front surface 22. The mask 60 includes a front edge 62. The mask 60 can be translatable in the X-direction and also rotates with turntable 50.

The brushing system 90 includes a brushing device 100 residing above mask 60. In an example, brushing device 100 includes a belt 110 having a continuous outer surface 112. The belt 110 rotates in a fixed direction, such as the Y-direction as shown. In an example, belt 110 can be made of foam-brush material, such as polyether foam, DA/JP/30TF, 30 kg/m3. In an example, the length and width of belt 110 can be such that it at least covers the diagonal of plate 20. Of course, other brushing devices 100 can be employed, e.g., one where belt 110 can be replaced by a pad that vibrates back and forth and the claims appended herewith should not be so limited.

Figure 7A:
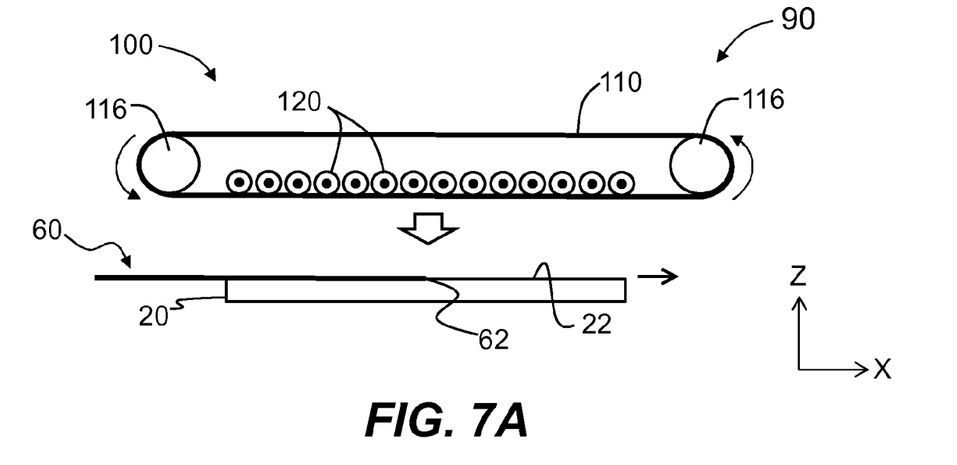
FIG. 7A is a cross-sectional view of the system of FIG. 6 illustrating an exemplary embodiment of a belt-type brushing device in the process of being lowered onto the mask and plate.

FIG. 7A is a cross-sectional view of an exemplary brushing system 90, with mask 60 disposed immediately adjacent front surface 22 of plate 20, with front edge 62 shown at about the middle of plate 20. The brushing device 100 is shown in the form of a belt-type device having one or more drive rollers 116 driving belt 110 so the lower portion of the belt travels in the Y-direction, i.e., the brushing direction. In an example, one or more support features 120, such as rollers, are also employed at the location where belt 110 travels in the Y-direction to provide downward support or downward pressure on polarization coating 30.

Figure 7B:
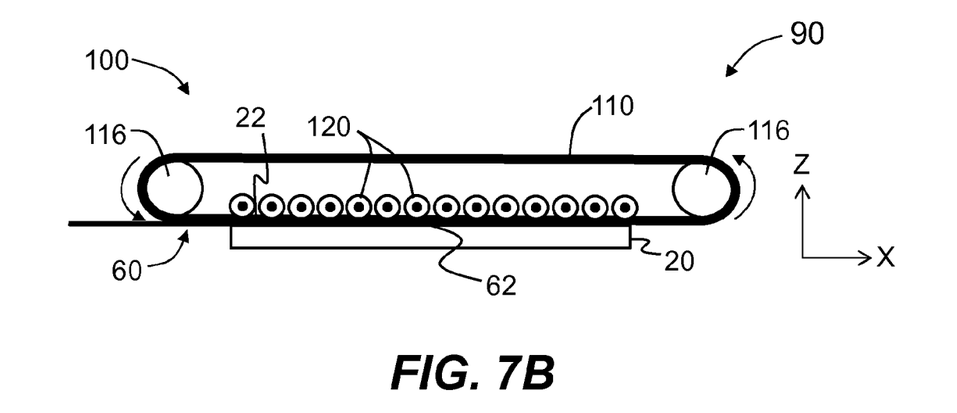
FIG. 7B is similar to FIG. 7A and shows the brushing device in contact with the mask and plate.

FIG. 7B shows belt 110 of brushing device 100 placed in contact with mask 60 and plate 20, and in particular in contact with the exposed portion of front surface 22 to the left of mask front edge 62.

FIGS. 8A through 8E are top-down views of brushing system 90, but with brushing device 100 not shown for ease of illustration, and illustrate the system in five different brushing positions. The large arrow AB shows the continuous brushing direction (Y-direction) of brushing system 90, while arrow AM shows the direction of the movement of mask 60, which can be initially in the X-direction. The mask 60 is shown as being transparent so the portion of brushing pattern 24 residing beneath the mask can be seen. In practice, mask 60 need not be opaque and in fact can be transparent or translucent.

With reference to FIGS. 8A through 8E, in the operation of brushing system 90, turntable 50 and mask 60 rotate counterclockwise while the mask can be also translated in the direction of arrow AM. Meanwhile, brushing device 100 continuously brushes in the Y-direction (arrow AB) and brushes that portion of plate front surface 22 exposed by the continuously moving mask 60, thereby forming brushing pattern 24. Thus, at the start position shown in FIG. 8A, the entire plate front surface 22 can be uncovered so that brushing pattern 24 can be all in the Y-direction.

Figure 8A:
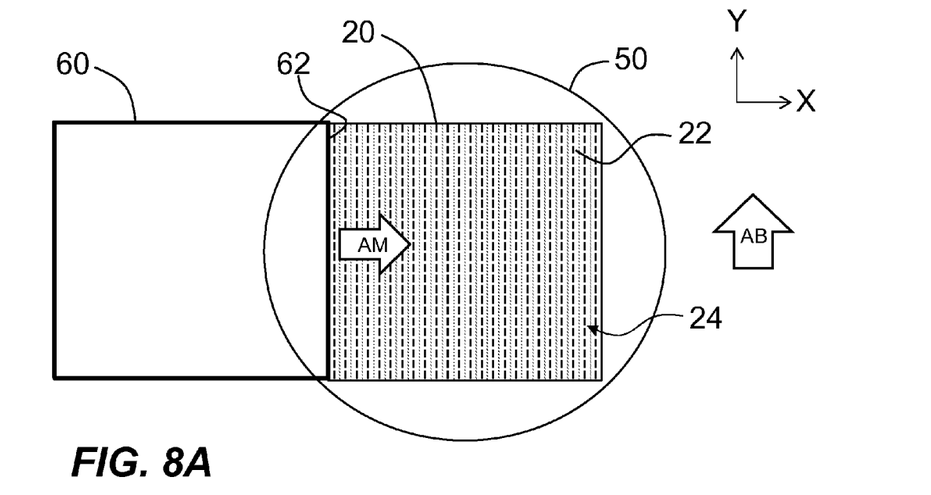
FIGS. 8A through 8E are top-down views of an exemplary brushing system, with the brushing device not shown for ease of illustration, illustrating the system in five different brushing positions and showing the evolving brushing pattern that remains protected beneath the moving mask.
Figure 8B:
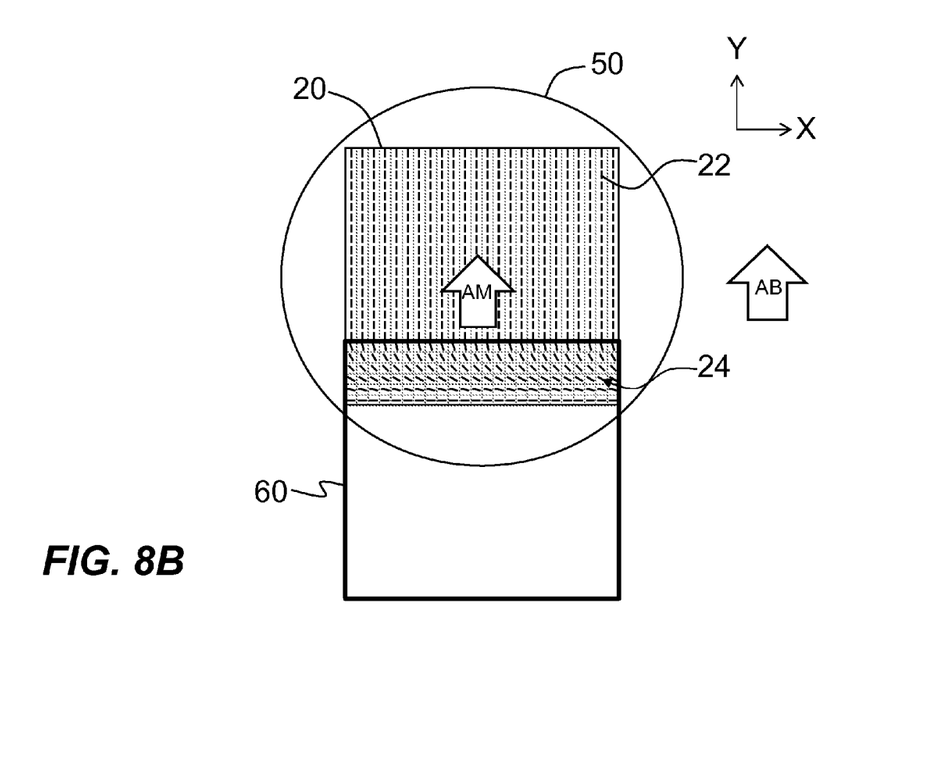

FIG. 8B shows turntable 50 having rotated by 90° so plate 20 and mask 60 are also rotated by 90° and the mask can be moving in the +Y-direction. At this point, mask front edge 62 has moved one-quarter of the way across plate front surface 22 so 25% of the front surface can be covered, thereby preserving an increasingly larger portion of the continuously varying portion of brushing pattern 24 beneath.

Figure 8C:
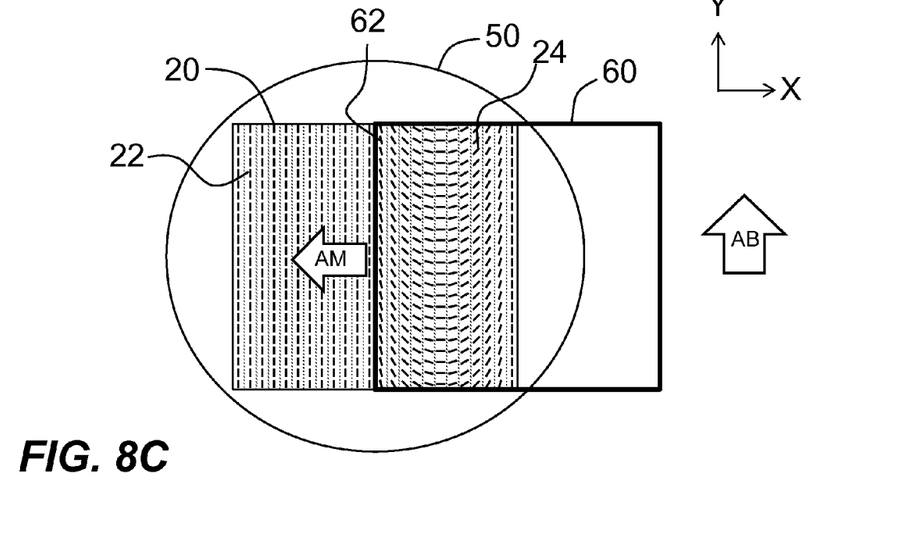

FIG. 8C shows turntable 50 having rotated by 180° so plate 20 and mask 60 are also rotated by 180° and the mask can be moving in the −X-direction. At this point, mask front edge 62 has moved halfway across plate front surface 22 so 50% of the front surface can be covered, thereby preserving the ever-larger continuously varying portion of brushing pattern 24 beneath.

Figure 8D:
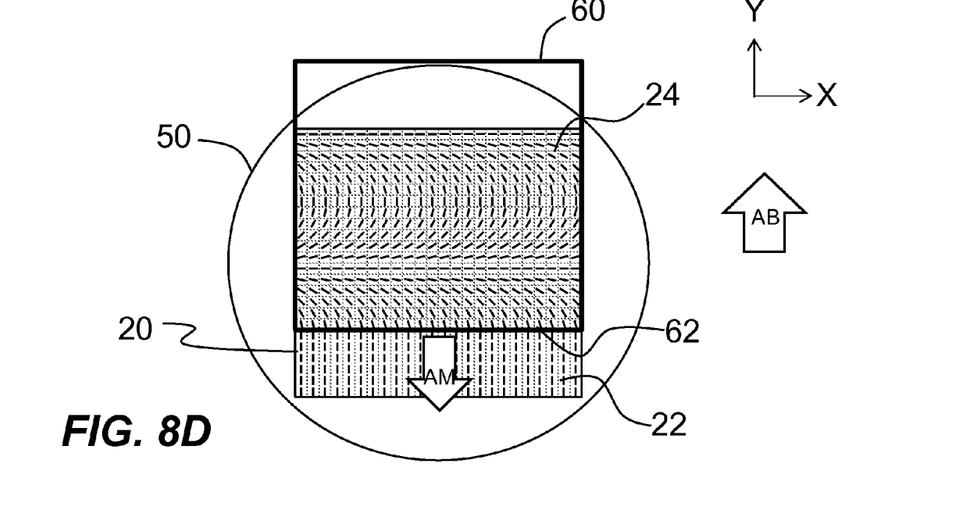

FIG. 8D shows turntable 50 having rotated by 270° so plate 20 and mask 60 are also rotated by 270° and the mask can be moving in the −Y-direction. At this point, mask front edge 62 has moved three-quarters of the way over plate front surface 22 so 75% of the front surface can be covered, thereby preserving the continuously varying portion of brushing pattern 24 beneath.

Figure 8E:
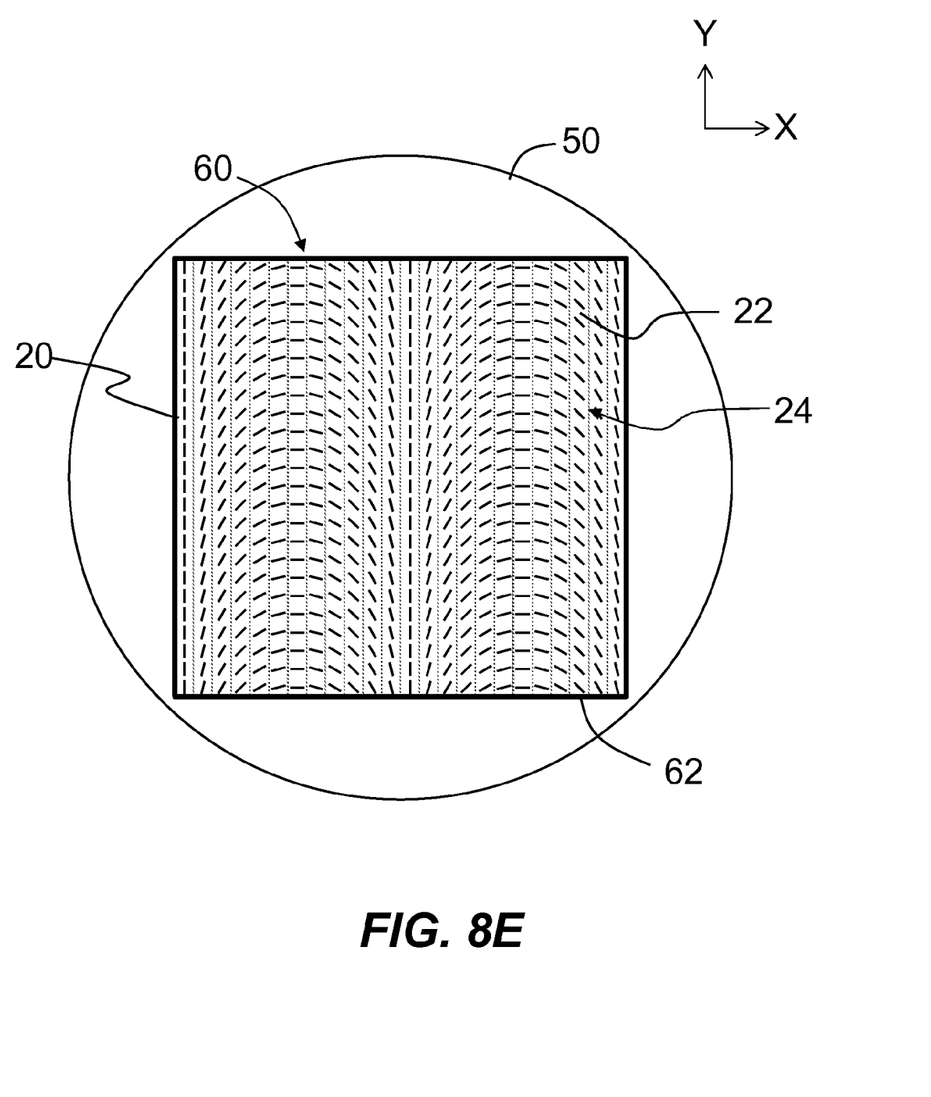
Figure 9A:
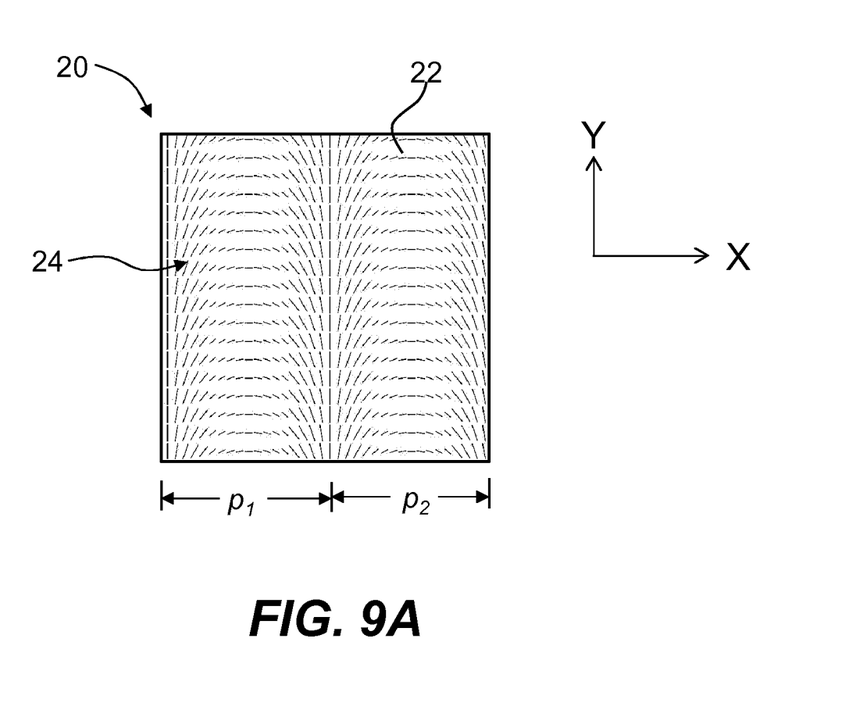
FIG. 9A is a top-down view of an exemplary of a fully brushed plate, wherein the brushing pattern has a period of p=2 and wherein the brushing pattern orientation varies over 180°.

FIG. 8E shows turntable 50 having rotated by 360° so plate 20 and mask 60 are also rotated by 360° and the mask completely covers plate front surface 22, thereby preserving the continuously varying portion of brushing pattern 24 beneath. The resulting brushed plate 20 is shown in FIG. 9A, wherein brushing pattern 24 has two periods p. Fewer or more periods p can be formed in this manner by adjusting the rate of movement of mask 60 and the rate of rotation of turntable 50.

Figure 9B:
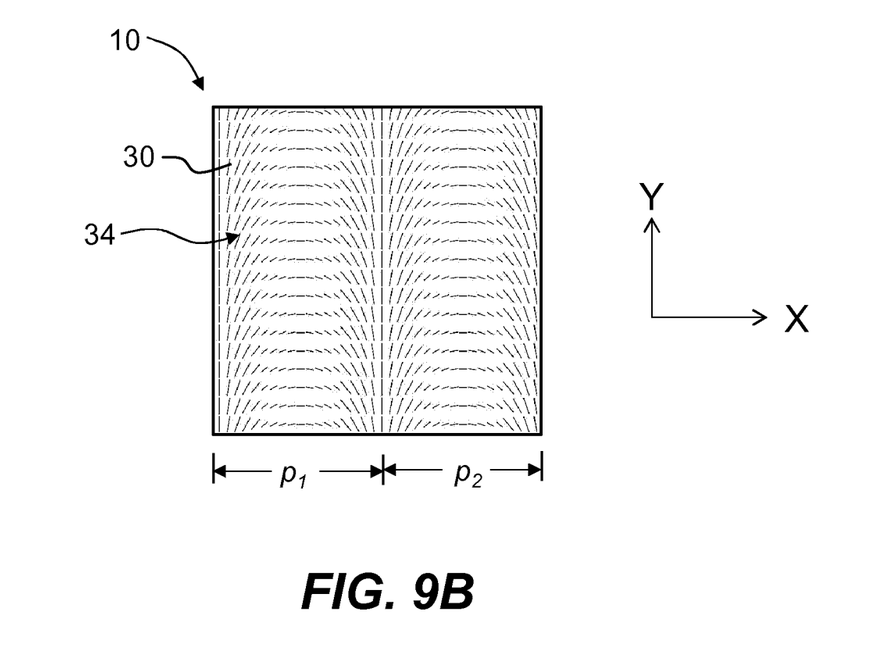
FIG. 9B is similar to FIG. 9A and shows a completed polarized pane, formed by adding POLARCOAT polarization material to the plate front surface, wherein a polarization material is responsive to the brushing pattern and substantially follows the brushing pattern.

At this point, plate front surface 22 can be coated with an exemplary polarizable coating, e.g., a POLARCOAT polarization coating 30, which responds to brushing pattern 24 by taking on polarization pattern 34, which substantially follows brushing pattern 24. The resulting polarized pane 10 is shown in FIG. 9B.

This general method of forming polarized pane 10 by brushing front surface 22 of plate 20 and then applying the POLARCOAT polarization coating 30 can be carried out for any reasonable number of periods p, with the movement of mask 60 during rotation determining the number of periods. In an example, the smallest practical width (in the X-direction) of a period p can be about 1 inch. Widths below 1 inch can be used, but it can take increasingly more time to generate high-quality patterns that ensure good transmission uniformity when used in variable transmission window 6. Thus, in an example, the width of the smallest period p can be about 1 inch.

In an exemplary embodiment, the number of periods p can be determined by how much displacement of one polarized pane 10A relative to another polarized pane 10B can be required to achieve a desired variation in light transmission for variable transmission window 6. This can be because a displacement of one period p corresponds to a transition from lowest to highest transmission. It is should be noted that for a given amount of displacement size, one of the polarized panes 10A and 10B should be made larger than the other (or half the displacement amount if both panes are translatable), and frame 40 should accommodate the required displacement.

An exemplary method of forming polarization pattern 34 in polarization coating 30 thus involves brushing plate front surface 22 while exposing different portions of the plate front surface. In some methods, the brushing direction of brushing device 100 can be continuously changed while mask 60 and plate 20 are held stationary to achieve the same polarization patterning effect. Also, different types of masks 60 can be used. In one example, mask 60 has an aperture that changes size. In another embodiment, mask 60 includes multiple apertures so multiple periods of brushing pattern 24 can be defined for a single 180° rotation. In another example, two masks 60 can be employed: one for even periods p and one for odd periods.

As discussed above, polarized pane 10 can have any reasonable number of periods p suitable for the intended application. In an example, one or more full rotations of turntable 50 can be used to generate brushing pattern 24. In an example, two full rotations can be used, wherein the first full rotation can be used to define odd-numbered columns and the second full rotation can be used to define even-numbered columns. During the first full rotation, mask 60 slowly closes the original aperture and reveals what had been previously covered. During the second full rotation, the original aperture remains covered as the second mask 60 slowly covers the apertures that were open after the first full rotation. The result can be multiple columns, wherein each column has a brushing direction (angle) changing continuously and representing one period p of the overall brushing pattern 24.

Figure 10:
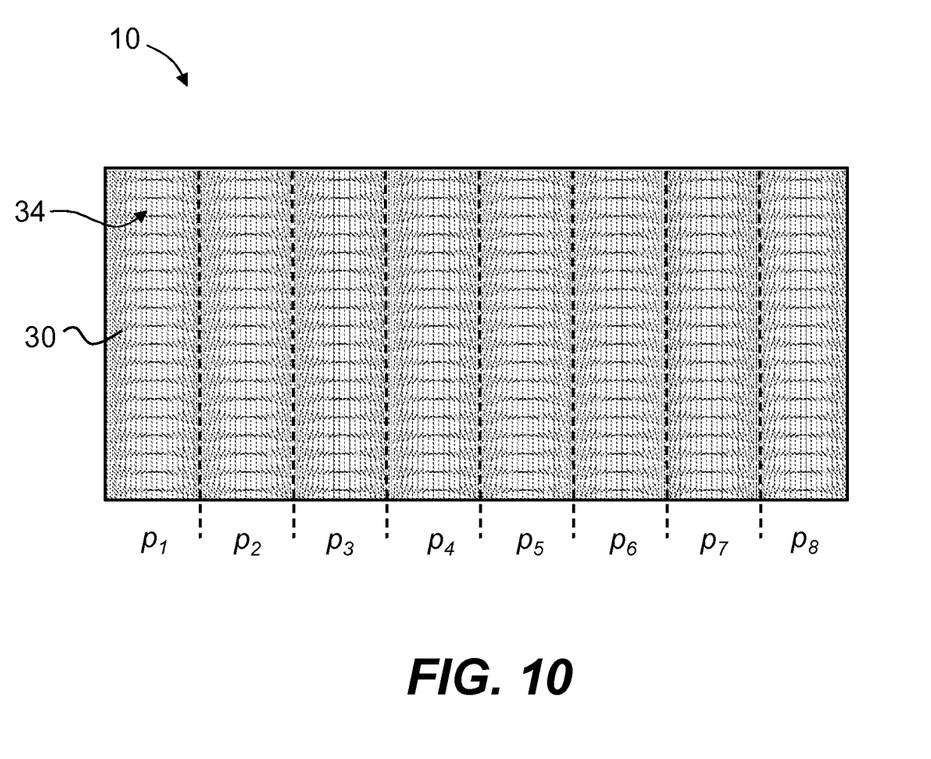
FIG. 10 is a top-down view of an exemplary polarized pane wherein the continuously varying polarization pattern has a period of p=8.

FIG. 10 is a front-on view of an exemplary polarized pane 10 wherein polarization coating 30 has a polarization pattern 34 defined by eight periods $p_1$ through $p_8$. A variable transmission window 6 having excellent grayscale control without substantial visual artifacts can be formed using two such polarized panes 10 and displacing one relative to the other. The multi-period polarized pane 10 is an example of the type of pane formed using a mask 60 having multiple apertures or multiple exposed surface areas during brushing.

It will be apparent to those skilled in the art that various modifications to the preferred embodiments of the disclosure as described herein can be made without departing from the spirit or scope of the disclosure as defined in the appended claims. Thus, the disclosure covers the modifications and variations, provided they come within the scope of the appended claims and the equivalents thereto.

What is claimed is:

1. A method of forming from a transparent plate having a surface a polarized pane for a window having a variable transmission, comprising:

a) disposing a mask immediately adjacent the surface of the transparent plate, thereby defining an exposed portion of the surface of the transparent plate;

b) rotating the plate and the mask together relative to a brushing device that brushes in a single fixed brushing direction;

c) contacting the brushing device to the rotating mask and the exposed portion of the transparent plate and brushing the rotating mask and the exposed portion of the transparent plate in the brushing direction;

d) during act c), continuously moving the mask over the surface of the transparent plate to reduce a size of the exposed portion until the mask covers the entire exposed portion of the surface of the transparent plate, thereby creating on the surface of the transparent plate a brushed surface having a brushing pattern with at least one period, wherein the brushing pattern varies continuously within each period; and depositing a polarizable material on the brushed surface to form a polarization pattern in the polarizable material substantially following the brushing pattern.

2. The method according to claim 1, wherein the plate is made of glass, plastic or acrylic.

3. The method according to claim 1, wherein the brushing is performed with a foam material.

4. The method according to claim 1, wherein the polarization pattern has a polarization orientation varying continuously over each period from 0° to +/−90° or from 0° to +/−180°.

5. The method according to claim 1, wherein the at least one period occurs over a distance of at least 1 inch.

6. The method according to claim 1, wherein the polarization pattern has multiple periods.

7. The method according to claim 1 further comprising the steps of:

forming first and second polarized panes; and arranging the first and second polarized panes in a frame adapted to allow for at least one of the first and second polarized panes to linearly translate relative to the other polarized pane to define a variable transmission.

8. A method of forming a polarized pane for a variable transmission window, comprising:

brushing in a single fixed brushing direction an exposed surface of a rotating transparent plate, wherein an amount of the exposed surface is defined by movable mask that rotates with the rotating plate;

moving the movable mask over the surface of the transparent plate to continuously reduce the amount of the exposed surface during said brushing to create on the surface of the transparent substrate a brushing pattern that varies continuously for each of one or more periods; and depositing a layer of polarizable material on the brushed plate surface to create a polarization pattern substantially matching the brushing pattern.

9. The method according to claim 8, wherein the mask comprises at least one aperture exposing a portion of the plate surface.

10. The method according to claim 8, wherein the brushing is performed with a foam material.

11. The method according to claim 8, wherein the at least one period occurs over a distance of at least 1 inch.

12. The method according to claim 8, wherein the polarization pattern has multiple periods and varies continuously over each period from 0° to +/−90° or from 0° to +/−180°.

13. The method according to claim 8, wherein the transparent plate is made of either glass, plastic or acrylic.

14. The method according to claim 8 further comprising the steps of:

forming first and second polarized panes; and arranging the first and second polarized panes in a frame adapted to allow for at least one of the first and second polarized panes to translate relative to the other polarized pane to define a variable transmission.

15. A method of forming a polarized pane using a glass plate having a surface, comprising:

a) masking the surface of the glass plate with an edge mask to form an exposed portion of the surface, wherein the exposed portion has an initial size;

b) moving the edge mask over the surface to continuously reduce the size of the exposed portion while rotating the edge mask and the glass plate together;

c) during act b), brushing the exposed portion of the surface in a single fixed direction to form a brushing pattern that varies continuously over the surface for each of multiple periods, wherein the brushing pattern patterns of the multiple periods are substantially identical; and coating the brushed surface with a polarizable material to create a polarization pattern having the same number of multiple periods as and being substantially identical to the brushing pattern.

16. The method according to claim 15, wherein the polarization pattern in each period has a range of polarization orientation from 0° to +/−90° or from 0° to +/−180°.

17. The method according to claim 15 further comprising the steps of:

forming first and second polarized panes; and arranging the first and second polarized panes in a frame adapted to allow for at least one of the first and second polarized panes to linearly translate relative to the other polarized pane to define a variable transmission.

18. The method according to claim 15, wherein the wherein the brushing is performed with a foam material.

19. The method according to claim 15, wherein said brushing of act c) includes employing a brushing device that contacts both the mask and the exposed portion of the surface of the glass plate.

* * * * *